(12) United States Patent
Ritchey

(10) Patent No.: US 11,623,366 B2
(45) Date of Patent: Apr. 11, 2023

(54) TOOLING INSERTS FOR CERAMIC MATRIX COMPOSITES

(71) Applicant: Rolls-Royce Corporation, Indianapolis, IN (US)

(72) Inventor: Andrew James Ritchey, Lafayette, IN (US)

(73) Assignee: ROLLS-ROYCE CORPORATION, Indianapolis, IN (US)

(*) Notice: Subject to any disclaimer, the term of this patent is extended or adjusted under 35 U.S.C. 154(b) by 1062 days.

(21) Appl. No.: 16/191,305

(22) Filed: Nov. 14, 2018

(65) Prior Publication Data

US 2019/0185381 A1 Jun. 20, 2019

Related U.S. Application Data

(60) Provisional application No. 62/599,329, filed on Dec. 15, 2017.

(51) Int. Cl.
  *B28B 23/00* (2006.01)
  *B33Y 10/00* (2015.01)
  (Continued)

(52) U.S. Cl.
  CPC ...... *B28B 23/0006* (2013.01); *B28B 23/0056* (2013.01); *B33Y 10/00* (2014.12);
  (Continued)

(58) Field of Classification Search
  CPC . B28B 23/0006; B28B 23/0056; B28B 1/001; B33Y 10/00; B33Y 50/02; B33Y 80/00; C04B 35/6264; C04B 35/62655; C04B 35/62844; C04B 35/573; C04B 35/6263; C04B 35/80; C04B 2235/6026; C04B 2235/606
  See application file for complete search history.

(56) References Cited

U.S. PATENT DOCUMENTS 2,410,888 A 11/1946 Lucy
5,429,488 A 7/1995 Neu
(Continued)

FOREIGN PATENT DOCUMENTS

CN 202454772 U 9/2012
CN 103737814 A 4/2014
CN 106202728 A 12/2016

OTHER PUBLICATIONS

Maier et al., "Analysis of Woven Fabrics and Fiber Composite Material Aerospace Parts using Industrial CT Data", 5th International Symposium on NDT in Aerospace, Nov. 13-15, 2013, 7 pgs.
(Continued)

*Primary Examiner* — Thomas C Lee
*Assistant Examiner* — Anzuman Sharmin
(74) *Attorney, Agent, or Firm* — Shumaker & Sieffert, P.A.

(57) ABSTRACT

The disclosure describes a system that includes a controller configured to receive a representation of a three-dimensional geometry of a preform, determine a set of dimensions of the preform from the representation of the preform, and determine dimensions of at least one insert for a fixed tooling based on a dimensional tolerance of the preform, the set of dimensions of the preform, and dimensions of the fixed tooling.

19 Claims, 5 Drawing Sheets

(51) Int. Cl.
*B33Y 50/02* (2015.01)
*C04B 35/626* (2006.01)
*C04B 35/628* (2006.01)
*B28B 1/00* (2006.01)
*B33Y 80/00* (2015.01)
*C04B 35/573* (2006.01)
*C04B 35/80* (2006.01)

(52) U.S. Cl.
CPC .......... *B33Y 50/02* (2014.12); *C04B 35/6264* (2013.01); *C04B 35/62655* (2013.01); *C04B 35/62844* (2013.01); *B28B 1/001* (2013.01); *B33Y 80/00* (2014.12); *C04B 35/573* (2013.01); *C04B 35/6263* (2013.01); *C04B 35/80* (2013.01); *C04B 2235/606* (2013.01); *C04B 2235/6026* (2013.01)

(56) References Cited

U.S. PATENT DOCUMENTS

| | | | |
|---|---|---|---|
| 6,340,424 B1 | 1/2002 | Elman et al. | |
| 6,825,856 B1 | 11/2004 | Fazzio et al. | |
| 9,690,274 B1* | 6/2017 | Markov | B33Y 50/02 |
| 10,118,315 B1* | 11/2018 | Cheng | B29C 33/424 |
| 10,472,976 B2* | 11/2019 | Freeman | F01D 25/246 |
| 2007/0050064 A1 | 3/2007 | Burgess et al. | |
| 2010/0023157 A1 | 1/2010 | Burgess et al. | |
| 2013/0028478 A1 | 1/2013 | St-Pierre et al. | |
| 2013/0328184 A1* | 12/2013 | Iwayama | H01L 23/15 |
| | | | 428/471 |
| 2014/0257543 A1 | 9/2014 | Rhodes et al. | |
| 2014/0257551 A1 | 9/2014 | Junod et al. | |
| 2014/0363054 A1 | 12/2014 | Noriega Gil et al. | |
| 2015/0127480 A1* | 5/2015 | Herrman | G06Q 30/0611 |
| | | | 705/26.4 |
| 2015/0160143 A1 | 6/2015 | Henderkott et al. | |
| 2016/0083305 A1 | 3/2016 | Goetz et al. | |
| 2016/0159698 A1 | 6/2016 | Landwehr | |
| 2016/0214907 A1 | 7/2016 | Shim et al. | |
| 2016/0230568 A1* | 8/2016 | Sippel | B32B 18/00 |
| 2016/0300117 A1 | 10/2016 | Yamamoto et al. | |
| 2016/0312633 A1* | 10/2016 | Sevincer | F01D 25/005 |
| 2017/0021495 A1* | 1/2017 | Davis | B25J 9/1005 |
| 2017/0073277 A1 | 3/2017 | Shim et al. | |
| 2017/0313629 A1 | 11/2017 | Shim et al. | |
| 2017/0324224 A1* | 11/2017 | Kyuno | H01T 13/58 |
| 2018/0028413 A1 | 2/2018 | Craig et al. | |
| 2018/0160932 A1 | 6/2018 | Abkai et al. | |
| 2018/0306260 A1* | 10/2018 | Moore | B28B 11/243 |
| 2019/0160538 A1* | 5/2019 | Blankenship | B23K 26/342 |
| 2019/0188881 A1 | 6/2019 | Ritchey et al. | |
| 2020/0208009 A1* | 7/2020 | Westhoff | C08G 18/792 |

OTHER PUBLICATIONS

Dierig et al., "Fiber Composite Material Analysis in Aerospace Using CT Data", 4th International Symposium on NDT in Aerospace 2012, 6 pgs., Applicant points out, in accordance with MPEP 609.04(a), that the year of publication, 2012, is sufficiently earlier than the effective U.S. filing date, 2018, so that the particular month of publication is not in issue.

Sharma et al., "Image Based Finite Element Analysis of 3D-Orthogonal Carbon-Carbon (C/C) Composite", Proceedings of the World Congress on Engineering 2010 vol. II, WCE 2010, Jun. 30-Jul. 2, 2010, 5 pgs.

Green et al., "Mechanical modelling of 3D woven composites considering realistic unit cell geometry", Composite Structures, Jul. 24, 2014, 10 pgs.

Zhao, "Modeling and Rendering Fabrics at Micron-Resolution", Cornell University Dissertation, Aug. 2014, 217 pgs.

Oagaro, "Heterogeneous multi-sensor data fusion using geometric transformations and Parzen windows for the nondestructive evaluation of gas transmission pipelines", Rowan University Thesis, 2004, 155 pgs., Applicant points out, in accordance with MPEP 609.04(a), that the year of publication, 2004, is sufficiently earlier than the effective U.S. filing date, 2018, so that the particular month of publication is not in issue.

Chiou et al., "Model-Based Software for Simulating Ultrasonic Pulse/Echo Inspections of Metal Components", AIP Conference Proceedings 1806, Feb. 2017, 12 pgs.

U.S. Appl. No. 16/191,322, by Rolls-Royce Corporation (Inventor: Ritchey), filed Nov. 14, 2018.

* cited by examiner

TOOLING INSERTS FOR CERAMIC MATRIX COMPOSITES

This application claims the benefit of U.S. Provisional Application No. 62/599,329, filed Dec. 15, 2017, which is incorporated herein by reference in its entirety.

TECHNICAL FIELD

The disclosure relates to methods and systems for manufacturing tooling for ceramic matrix composites.

BACKGROUND

Gas turbine engine components may be exposed to high temperature environments with an increasing demand for even higher temperatures. Economic and environmental concerns relating to the reduction of emissions and the increase of efficiency are driving the demand for higher gas turbine operating temperatures. To meet these demands, temperature capability of the components in hot sections such as blades, vanes, blade tracks, seal segments and combustor liners must be increased. Ceramic matrix composites (CMCs) may be used in sections where higher gas turbine engine operating temperatures are required. The high-temperature mechanical, physical, and chemical properties of the CMCs may allow the gas turbine engines to operate at higher temperatures than certain current engines.

SUMMARY

In some examples, the disclosure describes a method that includes determining, by a controller, a set of dimensions of a preform from a representation of a three-dimensional geometry of the preform. The method further includes determining, by the controller, dimensions of at least one insert for a fixed tooling based on a dimensional tolerance of the preform, the set of dimensions of the preform, and dimensions of the fixed tooling. The method further includes manufacturing the at least one insert based on the determined dimensions.

In other examples, the disclosure describes a method that includes determining, by a controller, a set of dimensions of a preform from a representation of a three-dimensional geometry of the preform. The method further includes determining, by the controller, dimensions of at least one insert for a fixed tooling based on a dimensional tolerance of the preform, the set of dimensions of the preform, and dimensions of the fixed tooling. The method further includes outputting, by the controller, an indication of a placement parameter of the at least one insert based on the determined dimensions of the at least one insert.

In other examples, the disclosure describes a system that includes a controller configured to receive a representation of a three-dimensional geometry of a preform, determine a set of dimensions of the preform from the representation of the preform, and determine dimensions of at least one insert for a fixed tooling based on a dimensional tolerance of the preform, the set of dimensions of the preform, and dimensions of the fixed tooling.

The details of one or more examples are set forth in the accompanying drawings and the description below. Other features, objects, and advantages of the disclosure will be apparent from the description and drawings, and from the claims.

DETAILED DESCRIPTION

Figure 1:
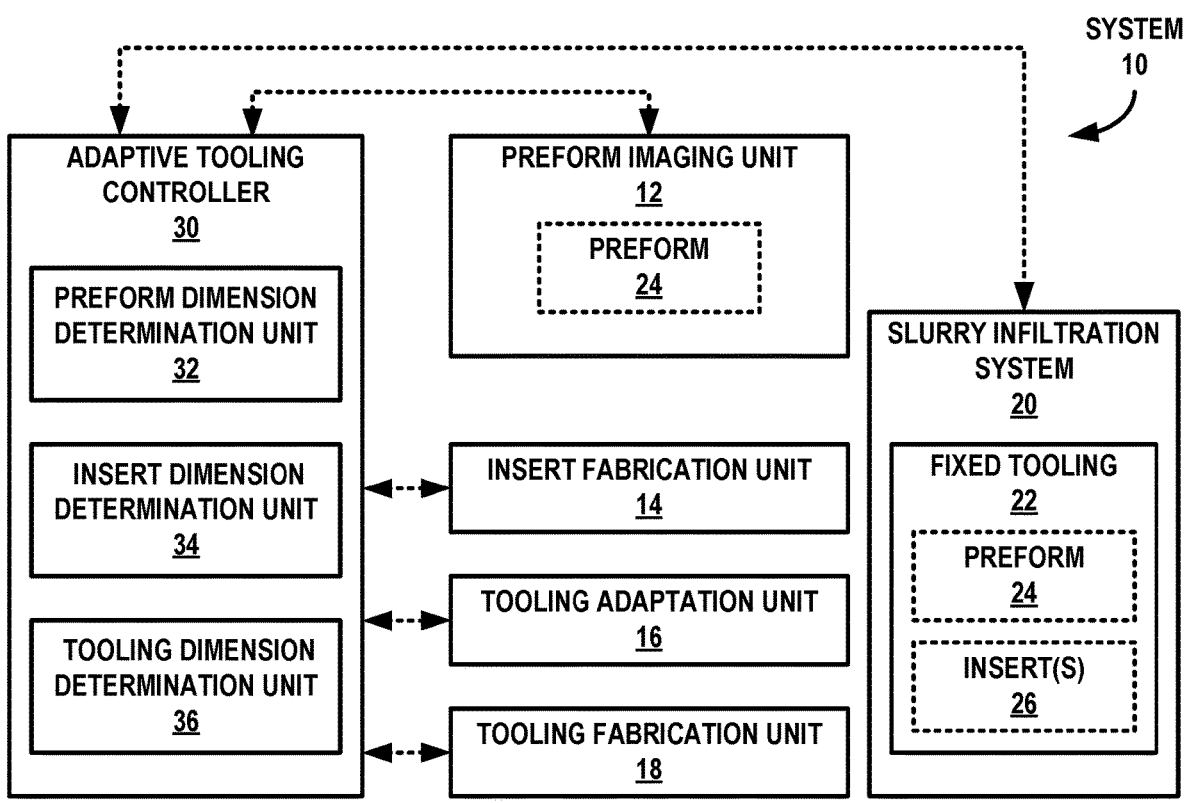
FIG. 1 is a conceptual and schematic block diagram illustrating an example system for manufacturing inserts to locate a preform within fixed tooling from a three-dimensional representation of the preform.

The disclosure describes systems and techniques for manufacturing inserts for positioning a preform in a fixed tooling based on a representation of the preform.

A ceramic matrix composite (CMC) component may be formed from a ceramic fiber preform. The ceramic fiber preform may be positioned on fixed spacers in a fixed tooling and the fixed tooling may be infiltrated with a ceramic matrix slurry. The resultant infiltrated preform may include an exterior layer of ceramic material surrounding the ceramic fiber preform and having a thickness that corresponds to a distance between bulk surfaces of the ceramic fiber preform and an interior wall of the fixed tooling. The spacers may be fixed to the fixed tooling, such that variance in shapes and dimensions of preforms may result in variance in the distance of the preform from the interior wall and corresponding variance in thickness of the exterior layer of the infiltrated preform. The resulting exterior layer may conform to a shape of the ceramic fiber preform and create a surface that may violate dimensional tolerance of the resultant CMC component. A smoothing layer may be subsequently applied to the exterior layer and machined to a desired roughness.

According to principles of the disclosure, a system may use a representation of a three-dimensional geometry of a preform to determine shapes, sizes, or both of customized inserts for positioning the preform in a fixed tooling. The representation of the preform may be a model, a series of cross-sectional images, a surface data set from an inspection of the preform, or any other representation that represents a geometry of the preform. The system may determine a set of dimensions of the preform from the representation of the preform. For example, the set of dimensions may account for variance in dimensions of the actual preform from design dimensions or other preforms intended for a particular CMC component. The system may use the set of dimensions of the preform to determine the dimensions of the one or more inserts based on the dimensions of the fixed tooling, the dimensions of the preform, and a dimensional tolerance of an exterior coating of the desired CMC component. For example, the dimensions of the one or more inserts may be configured to control a thickness of an exterior layer of a desired CMC component. The preform may be positioned to contact the one or more inserts within the fixed tooling for slurry infiltration. The resulting infiltrated preform may include an exterior layer that has less variation in thickness than a preform infiltrated using a fixed tooling having fixed spacers.

In some examples, the system may use a fixed tooling that includes a textured surface. For example, an interior surface of the fixed tooling may include a textured surface machined or formed into an interior wall of the fixed tooling. As another example, an insert used to position the preform in the fixed tooling may include a textured interior surface that is configured for the particular preform. During infiltration, the infiltrated slurry may substantially conform to the textured surface of the fixed tooling to result in an infiltrated preform having the textured surface. By including a textured surface in the fixed tooling, a CMC component with a textured surface may be formed using fewer steps than an infiltration process that does not use a textured fixed tooling. For example, the resulting textured surface may require less or substantially no additional processing (e.g., surface roughening) prior to further coatings being formed on the textured surface.

FIG. 1 is a conceptual and schematic block diagram illustrating an example system 10 for manufacturing inserts for a fixed tooling from a three-dimensional representation of a preform. System 10 includes adaptive tooling controller 30 and insert fabrication unit 14. System 10 may optionally include preform imaging unit 12, tooling adaptation unit 16, tooling fabrication unit 18, and slurry infiltration system 20.

In some examples, system 10 may include slurry infiltration system 20. Slurry infiltration system 20 may be configured to form a greenbody preform from a preform 24 by infiltrating preform 24 with a slurry to form an infiltrated preform and drying the infiltrated preform to form the greenbody preform. Operation of slurry infiltration system 20 will be described in more detail in FIGS. 3 and 4.

Preform 24 may be a porous preform or non-porous preform. In examples in which preform 24 is a porous preform, preform 24 may include a reinforcement material, such as a ceramic fiber or ceramic fiber precursor reinforcement structure. The reinforcement material may include one or more of a variety of different configurations, including, but not limited to: chopped fibers or tows, nonwoven fibers or tows, woven fibers or tows, braided fibers or tows, bundled fibers or tows, fabrics, three-dimensional weaves of fibers or tows, or the like. The reinforcement materials of preform 24 may be selected for a variety of properties including, but not limited to, modulus of elasticity, tensile strength, thermal stability, density, and filament diameter. A wide variety of reinforcement materials may be used including, but not limited to: ceramic fiber and ceramic fiber precursor materials such as silicon carbide (SiC), silicon nitride (SiN), carbon (C), alumina ($Al_2O_3$), mullite ($3Al_2O_3 2SiO_2$ or $2Al_2O_3 SiO_2$), precursors of these ceramics, or the like; glasses; metals; and polymers. Preform 24 may include any one of a variety of shapes and porosities, depending on the final use of the article formed from preform 24. For example, preform 24 may be a porous or non-porous preform having a relatively complex geometry, such as a gas turbine engine airfoil, or a relatively simple geometry, such as a brake disc.

Slurry infiltration system 20 may include a fixed tooling 22. Fixed tooling 22 may be a mold for infiltration of preform 24 so that an end CMC component may be formed having predetermined dimensions that correspond to fixed tooling 22. For example, due to manufacturing variation, dimensions of preform 24 may deviate from another preform or design dimensions of preform 24. Fixed tooling 22 may include an inner cavity to house preform 24 and affect a dimensional tolerance of a CMC component formed from preform 24. In some examples, the inner cavity of fixed tooling 22 may be sized to allow for formation of one or more layers on preform 24, e.g., during infiltration of preform 24 with a slurry, a molten material, or the like. For example, the inner cavity of fixed tooling 22 may be sized to define a predetermined volume between bulk external surfaces of preform 24 (e.g., defined by a plane or surface contacting outermost extending reinforcement materials of preform 24) and an interior surface of fixed tooling 22. In some examples, fixed tooling 22 may include channels in a wall of fixed tooling 22 to house the at least one insert 26, as will be explained further below. A variety of materials may be used for fixed tooling 22 including, but not limited to, graphite, silica, alumina, and the like. The material from which fixed tooling 22 is formed may be selected to allow release of preform 24 after completion of infiltration and may be sufficiently non-reactive with infiltration materials.

In some examples, fixed tooling 22 may include a textured interior surface. The textured interior surface may correspond to a desired textured exterior surface of the component formed from preform 24. For example, a CMC component may have additional layers applied to an exterior surface of the CMC component, such as environmental barrier coatings and thermal barrier coatings. These coating may better adhere to a textured surface rather than a smooth surface. The textured interior surface may be configured to impart the desired textured exterior surface to the exterior surface of preform 24 during infiltration. A variety of textures may be used including patterned textures, random textures, pseudo random textures, projection textures, depression textures, and the like.

Fixed tooling 22 may be configured to house at least one insert 26. At least one insert 26 may be housed in fixed tooling 22 such that preform 24 may be positioned within fixed tooling 22 to contact the at least one insert 26 so that preform 24 does not contact internal surfaces of fixed tooling. At least one insert 26 may be formed from a variety of materials, including, but not limited to, glass; metal; polymers, such as polymers suitable for three-dimensional printing; and the like.

In some examples, at least one insert 26 may be configured to position preform 24 at a desired location in fixed tooling 22. For example, due to variations in dimensions of preforms and deviations of preform 24 from design dimensions, each preform may fit differently in fixed tooling 22. Factors for which a desired location at which preform 24 is positioned in fixed tooling 22 may be selected include, but are not limited to, coating thickness variance, minimum coating thickness dimensional tolerance, maximum coating thickness dimensional tolerance, geometric conformity, and the like.

Figure 2A:
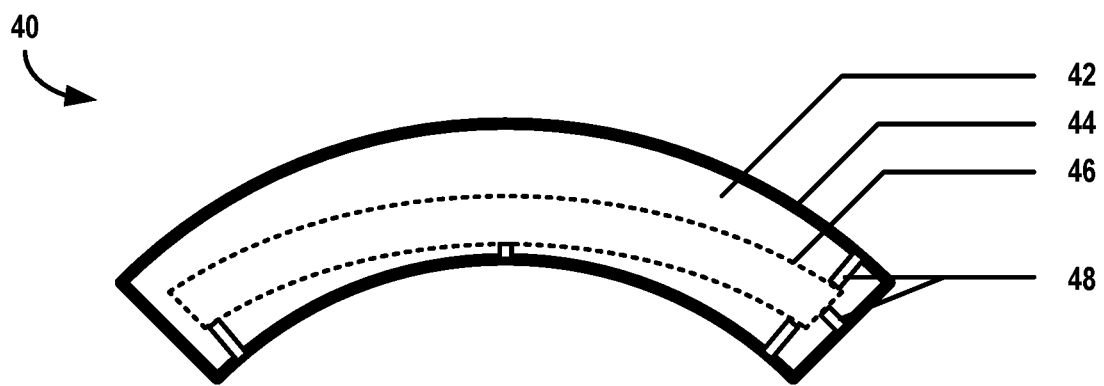
FIG. 2A is a conceptual cross-sectional diagram of a preform positioning system that includes a fixed tooling and fixed shims for positioning a preform.

In some examples, at least one insert 26 may include one or more fixed shims that may be specific to a shape of preform 24 and fixed tooling 22. The one or more fixed shims may operate as one or more points of contact between fixed tooling 22 and preform 24. FIG. 2A is a conceptual cross-sectional diagram of preform positioning system 40 that includes a fixed tooling 44 and fixed shims 48 for positioning a preform 46. Fixed tooling 44 may include structures for securing fixed shims 48 to fixed tooling 44, such as channels or holes in an interior wall of fixed tooling 44. Preform positioning system 40 may include a tooling volume 42 defined between a bulk exterior surface of preform 46 and an interior surface of fixed tooling 44. Fixed shims 48 may be configured to contact preform 46 and position preform 46 within fixed tooling 44 such that tooling volume 42 is sufficient for a desired surface coating of preform 46. Fixed shims 48 may be configured to fit against the interior surface of fixed tooling 44 and a bulk exterior surface of preform 46. Each of the fixed shims 48 may be a respective size, such that the sizing of fixed shims 48 and positioning of fixed shims 48 within fixed tooling 44 may be specific to preform 46 or a desired position of preform 46. In some examples, fixed shims 48 may each have a type corresponding to a dimension of the fixed shim.

Figure 2B:
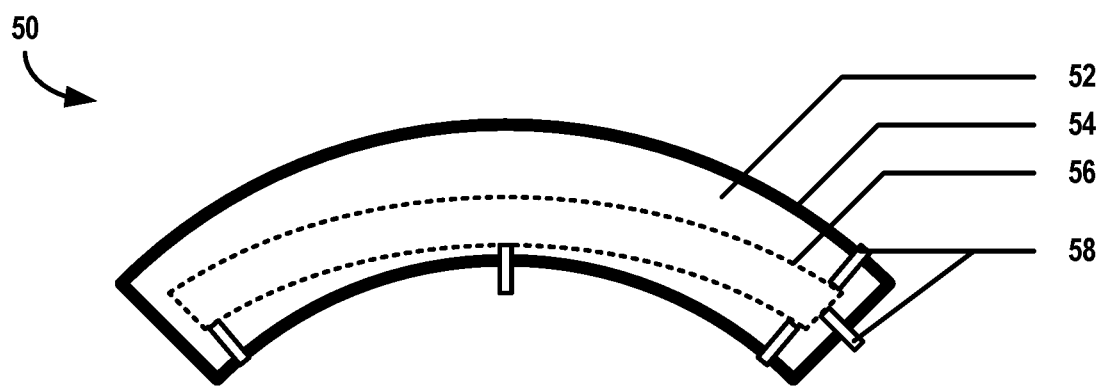
FIG. 2B is a conceptual cross-sectional diagram of a preform positioning system that includes a fixed tooling and adaptive shims for positioning a preform.

In some examples, at least one insert 26 may include one or more adaptive shims that may be positioned in fixed tooling 22 at a position that is specific to a shape of preform 24 and fixed tooling 22. The one or more adaptive shims may be fine-tuned to an insertion distance. FIG. 2B is a conceptual cross-sectional diagram of a preform positioning system 50 that includes a fixed tooling 54 and adaptive shims 58 for positioning a preform 56. Fixed tooling 54 may include channels through a wall of fixed tooling 54 that allow adaptive shims 58 to be inserted various distances into fixed tooling 54. Preform positioning system 50 may include a tooling volume 52 defined between a bulk exterior surface of preform 56 and an interior surface of fixed tooling 54 and a bulk exterior surface of preform 56. Adaptive shims 58 may be configured to contact preform 56 and position preform 56 within fixed tooling 54 such that tooling volume 52 is sufficient for a desired surface coating of preform 56. Adaptive shims 58 may be configured to fit into channels in fixed tooling 54 at a respective predetermined distance, such that tooling volume 52 may be sufficient for the desired surface coating of preform 56. Adaptive shims 58 may include tuning structures, such as screws, configured to fine tune the insertion distance of adaptive shims 58 into fixed tooling 54.

Figure 2C:
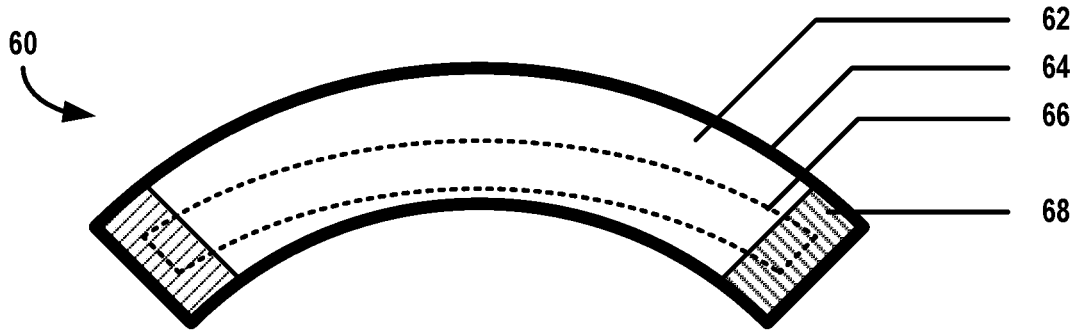
FIG. 2C is a conceptual cross-sectional diagram of a preform positioning system that includes a fixed tooling and standoffs for positioning a preform.

In some examples, at least one insert 26 may include one or more standoffs that may be specific to a shape of preform 24 and fixed tooling 22. The one or more standoffs may be configured to secure preform 24 in fixed tooling 22 using fewer total contact points than shims. FIG. 2C is a conceptual cross-sectional diagram of a preform positioning system 60 that includes a fixed tooling 64 and standoffs 68 for positioning a preform 66. Preform positioning system 60 may include a volume 62 defined between a bulk exterior surface of preform 66 and an interior surface of fixed tooling 64. Standoffs 68 may be configured to contact ends of preform 66 in a cavity of standoffs 68 and position preform 66 within fixed tooling 64 such that tooling volume 62 is sufficient for a desired surface coating of preform 66. Standoffs 68 may be configured to fit into ends of fixed tooling 64 and contact an interior surface of fixed tooling 64 at two or more surfaces.

Figure 2D:
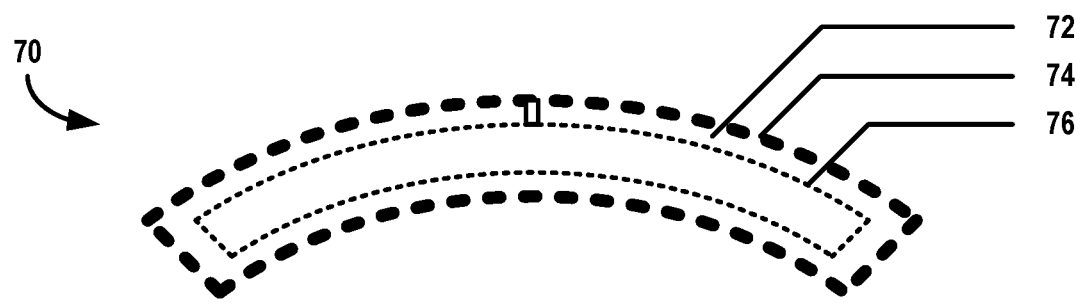
FIG. 2D is a conceptual cross-sectional diagram of a preform positioning system that includes an adaptive tooling and fixed shims.

In some examples, the tooling 22 may be an adaptive tooling that may be specific to a shape of preform 24. For example, some components may require tight control of a coating thickness, but relatively loose overall dimensional tolerances, such that the adaptive tooling may provide a more controlled coating thickness than a fixed tooling that is configured for a tight overall dimensional tolerance. FIG. 2D is a conceptual cross-sectional diagram of a preform positioning system 70 that includes an adaptive tooling 74 and fixed shims 78. Preform positioning system 70 may include a tooling volume 72 defined between a bulk exterior surface of preform 76 and an interior surface of adaptive tooling 74. In some examples, fixed shims (not shown) may be configured to contact preform 76 and position preform 76 within adaptive tooling 74 such that tooling volume 72 is sufficient for a desired surface coating of preform 76. The fixed shims may be configured to fit against the interior surface of adaptive tooling 74.

Figure 2E:
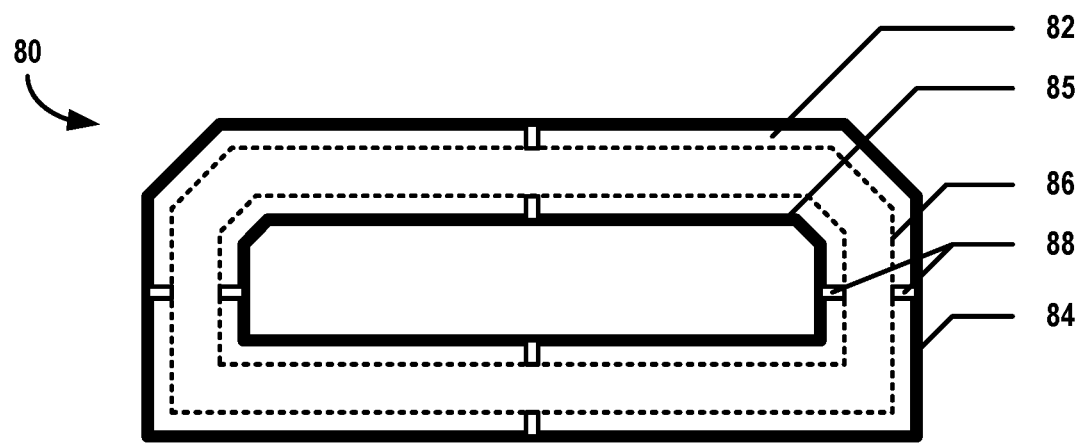
FIG. 2E is a conceptual cross-sectional diagram of a preform positioning system that includes a fixed tooling having an interior portion and an exterior portion.

In some examples, at least one insert 26 may include one or more fixed shims that may contact an interior and exterior surface of preform 24. FIG. 2E is a conceptual cross-sectional diagram of a preform positioning system 80 that includes fixed tooling 84, 85, having an interior portion 85 and an exterior portion 84. Preform positioning system 80 may include a tooling volume 82 defined between a bulk exterior surface of preform 86 and interior surfaces of exterior portion 84 and interior portion 85 of fixed tooling 84, 85. Fixed shims 88 may be configured to contact preform 86 and position preform 86 within fixed tooling 84, 85 such that tooling volume 82 is sufficient for a desired surface coating of preform 86. Fixed shims 88 may be configured to fit against the interior surface of fixed tooling 84, 85 and a bulk exterior surface of preform 86.

System 10 may include preform imaging unit 12. Preform imaging unit 12 may be configured to determine a representation of a three-dimensional geometry of preform 24, such as a design surface data set for preform 24. For example, the design surface data set may include data interpolated from CAD data that defines the design intent surface of the component. Preform imaging unit 12 may be configured to perform a fixturing operation where the component is placed in a fixture. Preform imaging unit 12 may be configured to perform a visual or optical inspection process, a radiant energy inspection process, and the like. Preform imaging unit 12 may be any imager capable of determining the representation of the three-dimensional geometry of preform 24 including, but not limited to, an x-ray imager, an infrared imager, a laser imager or 3D laser scanner, a visible light camera, and the like. In some examples, preform imaging unit 12 may include hardware and/or software configured to scan preform 24 and determine the representation of the three-dimensional geometry of preform 24 based on the scanned images from preform 24. For example, preform imager may include computed tomography hardware and/or software capable of creating three-dimensional representations of the three-dimensional geometry of preform 24 from image scans of preform 24. Preform imaging unit 12 may produce a digital image or a data cloud of preform 24, such as a surface of preform 24, that may be used to produce the representation of the three-dimensional geometry of preform 24, such as a surface data set.

In some examples, preform imaging unit 12 may be communicatively coupled to adaptive tooling controller 30 and configured to send the representation of the three-dimensional geometry of preform 24 to adaptive tooling controller 30. For example, preform imaging unit 12 may be configured to send a representation signal that includes the representation of the three-dimensional geometry of preform 24 (e.g., data corresponding to the representation of the three-dimensional geometry of preform 24), such as a two-dimensional image of a series of two-dimensional images, a stack of two-dimensional images, a three-dimensional model, or the like. In some examples, preform imaging unit 12 may be configured to receive command signals from a controller, such as adaptive tooling controller 30 or another system controller, instructing preform imaging unit 12 to scan preform 24. For example, preform imaging unit 12 may be configured to receive a scan signal (e.g., instructions to scan at a particular location, such as a depth of preform 24) from adaptive tooling controller 30 that includes information for scanning preform 24.

Adaptive tooling controller 30 may be communicatively coupled to and/or configured to control one or more components of system 10, including any one or more of preform imager 12, insert fabricator 14, tooling adaptation device 16, tooling fabricator 18, or slurry infiltration system 20. Adaptive tooling controller 30 may include any one or more of a wide range of devices, including processors (e.g., one or more microprocessors, one or more application specific integrated circuits (ASICs), one or more field programmable gate arrays (FPGAs), or the like), one or more servers, one or more desktop computers, one or more notebook (i.e., laptop) computers, one or more cloud computing clusters, or the like. In some example, adaptive tooling controller 30 may be module of another controller, such as a system controller.

Adaptive tooling controller 30 may be configured to receive the representation of the three-dimensional geometry of preform 24 and other information related to preform 24. Adaptive tooling controller 30 may include one or more modules configured to determine dimensions of preform 24, insert(s) 26, and/or fixed tooling 22. For example, adaptive tooling controller 30 may include preform dimension determination unit 32, insert dimension determination unit 34, and tooling dimension determination unit 36. Preform dimension determination unit 32 may be configured to determine a set of dimensions of preform 24 from the representation of preform 24 received from preform imaging unit 12. Insert dimension determination unit 34 may be configured to determine dimensions of at least one insert for fixed tooling 22 based on a dimensional tolerance of preform 24, a set of dimensions of preform 24, and dimension of fixed tooling 22. Tooling dimension determination unit 36 may be configured to determine dimensions of fixed tooling 22. Adaptive tooling controller 30 may be configured to send dimension signals to any of insert fabrication unit 14, tooling adaptation unit 16, and/or tooling fabrication unit 18. Further operation of adaptive tooling controller 30 may be described in FIG. 3 below.

In some examples, insert fabrication unit 14 may receive additional information for manufacturing at least one insert 26. For example, insert fabrication unit 14 may receive information related to channel width and wall thickness of fixed tooling 22 for manufacturing fixed or adaptive shims, as shown in FIGS. 2A, 2B, and 2D. As another example, insert fabrication unit 14 may receive information related to interior dimensions of fixed tooling 22 for manufacturing standoffs, as shown in FIG. 2C.

In some examples, system 10 includes insert fabrication unit 14. Insert fabrication unit 14 may be communicatively coupled to adaptive tooling controller 12 and configured to receive dimensions of at least one insert 26 from adaptive tooling controller 30. For example, insert fabrication unit 14 may be configured to receive a fabrication command or set of instructions from adaptive tooling controller 30 that includes dimensions for at least one insert 26. Insert fabrication unit 14 may be configured to manufacture at least one insert 26 based on the determined dimensions from adaptive tooling controller 30. The determined dimensions may include, for example, a shape or contour of at least one insert 26; a size, such as a length or diameter, of at least one insert 26; a surface texture of at least one insert 26; and the like. A variety of machines may be used for insert fabrication unit 14 including, but not limited to three-dimensional (3D) printers, molding machines, and the like.

In some examples, system 10 may include tooling adaptation unit 16. Tooling adaptation unit 16 may be communicatively coupled to adaptive tooling controller 30 and configured to receive tooling adaptation commands from adaptive tooling controller 30. For example, tooling adaptation unit 16 may be configured to receive a tooling adaptation command that includes dimensions of the at least one insert 26. Tooling adaptation unit 16 may be configured to position the at least one insert 26 in fixed tooling 22 based on the dimensions of the at least one insert 26. In some examples, tooling adaptation unit 16 may be further configured to position the at least one insert 26 in fixed tooling 22 based on the dimensions of fixed tooling 22 and the dimension of preform 24. For example, if the at least one insert 26 is an adaptive shim, tooling adaptation unit 16 may be configured to receive a tooling adaptation command that includes an insertion distance of at least one insert 26 and position the at least one insert 26 in fixed tooling 22 based on the insertion distance. Tooling adaptation unit 16 may include equipment for providing a variety of positioning functions including, but not limited to, actuators for inserting at least one insert 26 into fixed tooling 22, braces for securing the at least one insert 26 to fixed tooling 22, and the like.

In some examples, system 10 may include tooling fabrication unit 18. Tooling fabrication unit 18 may be communicatively coupled to adaptive tooling controller 30 and configured to receive tooling fabrication commands from adaptive tooling controller 30. For example, tooling fabrication unit 18 may be configured to receive a tooling fabrication command from adaptive tooling controller 30 that includes dimensions of fixed tooling 22. Tooling fabrication unit 18 may be configured to manufacture fixed tooling 22 based on the dimensions from of fixed tooling 22 from adaptive tooling controller 30. In some examples, tooling fabrication unit 18 may be configured to manufacture fixed tooling 22 with a textured interior surface. A variety of tooling fabrication units 18 may be used including, but not limited to, machining tools, such as grinders and mills; die cast molding machines; and the like.

In some examples, tooling fabrication unit 18 may be configured to manufacture a tooling based on the set of dimensions of preform 24. For example, as shown in FIG. 2E, adaptive tooling 84 may be configured to correspond to a shape of preform 24 and the surface layer to be formed on preform 24. Tooling fabrication unit 18 may be configured to receive the set of dimensions of preform 24 from adaptive tooling controller 30 and manufacture adapting tooling 84 based on the set of dimensions of preform 24.

At least one insert 26 manufactured by system 10 may be used to produce CMC components that have a more even exterior coating, higher dimensional compliance, and simpler production. For example, in implementations where at least one insert 26 is used to position preform 24 in fixed tooling 22, the resulting infiltrated preform may have a lower variance in coating thickness or higher compliance with coating thickness tolerances, resulting in a more uniform surface texture. In some examples, in which at least one insert 26 is used to form a textured exterior surface on preform 24, the resulting infiltrated preform may have a textured exterior surface that is within dimensional tolerance for preform 24 with fewer steps than infiltration methods that use separate coating or machining processes to form a textured exterior surface.

Figure 3:
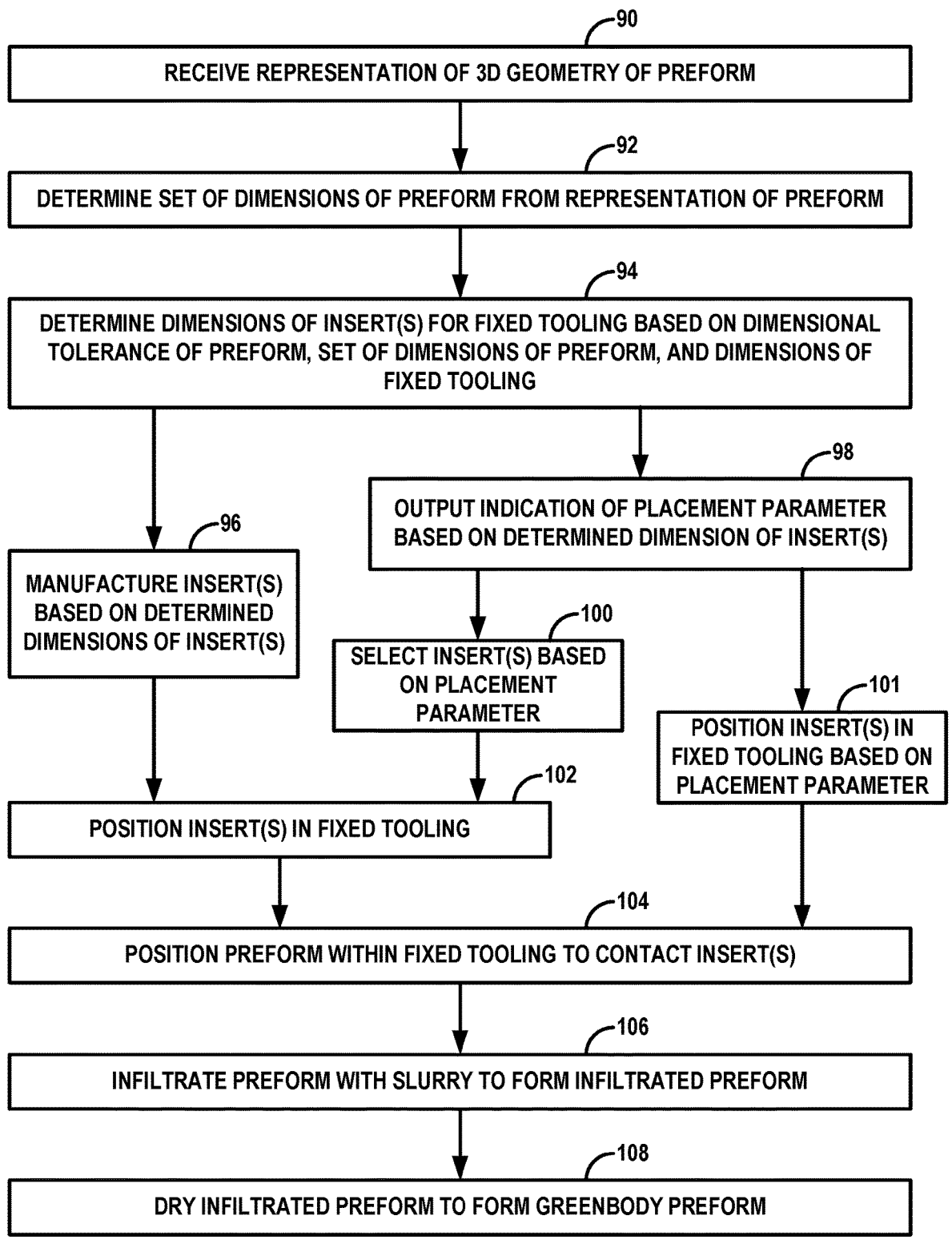
FIG. 3 is a flow diagram illustrating an example technique for manufacturing a greenbody preform from a representation of a three-dimensional geometry of a preform.

FIG. 3 is a flow diagram illustrating an example technique for manufacturing a greenbody preform based on a representation of a three-dimensional geometry of a preform. The technique of FIG. 3 will be described with concurrent reference to system 10 of FIG. 1, although one of ordinary skill will understand that the technique of FIG. 3 may be performed by other systems that include more or fewer components, and that system 10 may perform other techniques. For example, one or more control steps performed by adaptive tooling controller 30 may be performed manually or by using another component of system 10.

Adaptive tooling controller 30 may receive a representation of a three-dimensional geometry of preform 24 (90). For example, adaptive tooling controller 30 may receive a representation signal from preform imaging unit 12 that includes the representation of the three-dimensional geometry of preform 24. The representation may include any model that represents at least bulk surface dimensions of preform 24. For example, the representation may be a model of a bulk three-dimensional outer surface of the preform 24.

In some examples, adaptive tooling controller 30 may cause preform imaging unit 12 to generate the representation of the three-dimensional geometry of preform 24. For example, preform 24 may be positioned in an interior cavity of preform imaging unit 12. Adaptive tooling controller 30 may send a control signal to preform imaging unit 12 that causes preform imaging unit 12 to capture images of preform 24. Preform imaging unit 12 may determine the representation of the three-dimensional geometry of preform 24 from the images of preform 24, such as through computed tomography. Preform imaging unit 12 may output a representation signal that includes the representation of the three-dimensional geometry of preform 24.

Preform dimension determination unit 32 of adaptive tooling controller 30 may determine a set of dimensions of preform 24 from the representation of preform 24 (92). The set of dimensions of preform 24 may include a set of dimensions corresponding to a bulk surface of preform 24 as based on the representation of preform 24.

Insert dimension determination unit 34 of adaptive tooling controller 30 may determine dimensions of at least one insert 26 for fixed tooling 22 based on a dimensional tolerance of preform 24, the set of dimensions of preform 24, and dimensions of fixed tooling 22 (94). In some examples, adaptive tooling controller 30 may receive an input signal that includes the dimensional tolerance of preform 24 and the dimensions of fixed tooling 22. The dimensional tolerance of preform 24 may include a dimensional tolerance between a surface of preform 24 and a surface of fixed tooling 22, as represented by the dimensions of fixed tooling 22. For example, a layer or coating may eventually be applied to an outer surface of preform 24. The layer or coating may occupy a space between the outer surface of preform 24 and an inner surface of fixed tooling 22. To provide the desired space between the outer surface of preform 24 and the inner surface of fixed tooling 22, preform 24 may have a specified dimensional tolerance. In this way, the dimensional tolerance may define an acceptable range of thicknesses of the eventual layer or coating. Insert dimension determination unit 34 may add the dimensional tolerance of preform 24 to the set of dimensions of preform 24 to determine a set of adjusted dimensions of preform 24. Insert dimension determination unit 34 may determine a spatial region within fixed tooling 22 in which the set of adjusted dimensions of preform 24 would fit. Insert dimension determination unit may determine dimensions of the at least one insert 26 so that the at least one insert 26 is configured to contact preform 24 and position preform 24, individually or in combination with other inserts, in the spatial region.

In some examples, insert dimension determination unit 34 may determine a surface texture of the at least one insert based on a desired exterior surface texture of preform 24. For example, insert dimension determination unit 34 may adjust the dimensions of the at least one insert to include a height of surface roughness of the exterior textured surface while staying within the dimensional tolerance.

In some examples, tooling dimension determination unit 26 of adaptive tooling controller 30 may determine dimensions of fixed tooling 22 based on the dimensional tolerance of preform 24 and the set of dimensions of preform 24. For example, if preform 24 does not have an associated fixed tooling 22 that is sized such that preform 24 would fit within fixed tooling 22 in the dimensional tolerance, adaptive tooling controller 30 may determine dimensions of fixed tooling 22 such that preform 24 may fit within fixed tooling 22 within the dimensional tolerance. Tooling dimension determination unit 26 may add the dimensional tolerance of preform 24 to the set of dimensions of preform 24 to determine a set or range of adjusted dimensions of preform 24. Tooling dimension determination unit 26 may determine dimensions of fixed tooling 22 so that the at least one insert 26 may contact preform 24 and position preform 24, individually or in combination with other inserts, in the spatial region. Adaptive tooling controller 30 may cause tooling fabrication unit 18 to manufacture fixed tooling 22 according to the dimensions of fixed tooling 22. The at least one adaptive insert 26 may be an insert having a standard size, such that the at least one insert is particular to an insertion distance or range of insertion differences of preform 24, but not particular to only preform 24.

In some examples, system 10 may use the determined dimensions to manufacture the at least one insert 26 such that the at least one insert 26 may be configured specifically for preform 24. Adaptive tooling controller 30 may cause insert fabrication unit 14 to manufacture at least one insert 26 based on the determined dimensions of the at least one insert 26 (96). For example, adaptive tooling controller 30 may send a control signal to insert fabrication unit 14 that includes the determined dimensions of at least one insert 26. Insert fabrication unit 14 may receive the control signal that includes the determined dimensions of at least on insert 26 and manufacture at least on insert 26 based on the determined dimensions of at least one insert 26. In examples in which at least one insert 26 includes a plurality of inserts, each insert of the plurality of inserts may have same or different determined dimensions.

At least one insert 26 may be positioned in fixed tooling 22 based on the dimensions of at least one insert 26 (102). In some examples, an operator may place at least one insert 26 into a spacing of fixed tooling 22 based on the dimensions of the at least one insert 26. For example, if at least one insert 26 is a fixed shim intended for full insertion into fixed tooling 22 such that an end of the fixed shim is flush with a surface of fixed tooling 22, the operator may place at least one insert 26 fully into fixed tooling 22. In some examples, adaptive tooling controller 30 may cause tooling adaptation unit 16 to position at least one insert 26 in fixed tooling 22 based on the dimensions of the at least one insert 26. For example, an operator may place the at least one insert 26 into a channel of fixed tooling 22. Tooling adaptation unit 16 may receive the dimensions of at least one insert 26 and an insertion distance from adaptive tooling controller 30 and position the at least one insert 26 into the fixed tooling to the insertion distance.

In some examples, system 10 may use the determined dimensions to indicate, such as to an operator, the at least one insert 26 to be selected and/or positioned in fixed tooling 22. For example, the at least one insert 26 may be of a standardized size, such that selection of the at least one insert 26 and/or positioning of the at least one insert 26 may be customized for the particular preform 24. Adaptive tooling controller 30 may output an indication of a placement parameter of the at least one insert 26 based on the determined dimensions of the at least one insert 26. A placement parameter may be a parameter that indicates a dimension of the at least one insert 26 or placement distance of the at least one insert 26 into fixed tooling 22.

In some examples, the placement parameter may include a type of the at least one insert 26. Adaptive tooling controller 30 may determine the type of the at least one insert 26 based on the determined dimensions of the at least one insert 26. For example, adaptive tooling controller 30 may match the determined dimensions with a dimension of a type of insert. Adaptive tooling controller 30 may output an indication of a type of the at least one insert 26 based on the determined dimensions of the at least one insert 26. The at least one insert 26 may be selected based on the placement parameter (100). For example, an operator may see the indication of the type of the at least one insert and select the at least one insert having the type based on the indication.

In some examples, the placement parameter may include a placement distance of the at least on insert 26 into fixed tooling 22. Adaptive tooling controller 30 may determine the placement distance of the at least one insert 26 based on the determined dimensions of the at least one insert 26. Adaptive tooling controller 30 may output an indication of the placement distance of the at least one insert 26 based on the determined dimensions of the at least one insert 26. The at least one insert 26 may be positioned in fixed tooling 22 based on the placement parameter (101). For example, an operator may see the indication of the placement distance and position the at least on insert 26 into fixed tooling 22 based on the indication.

Preform 24 may be positioned within fixed tooling 22 to contact the at least one insert 26 (104). For example, an operator may place preform 24 into a tooling volume of fixed tooling 22 such that preform 24 contacts the at least one insert 26. The at least one insert 26 may create a fill volume between bulk exterior surfaces of preform 24 and an interior surface of fixed tooling 22. The extra fill volume may allow for a thickness to be reduced through, for example, machining of an exterior of a ceramic matrix composite component formed from preform 24. In some examples, preform 24 may be rigidized, such as by a vapor infiltration system, before being positioned within fixed tooling 22.

Adaptive tooling controller 30 then may cause slurry infiltration system 20 to infiltrate preform 24 with a slurry to form an infiltrated preform (106). Any suitable slurry infiltration method may be used to infiltrate preform 24 with a slurry. The slurry may be injected into fixed tooling 22 to infiltrate preform 24. In some examples, slurry infiltration system 20 may infiltrate preform 24 with a slurry that includes one or more ceramic powders in a carrier material. The ceramic powders may be any metal or ceramic powders or particles useful as a matrix precursor material including, but not limited to, silicon, silicon carbide (SiC), silicon/silicon carbide, silicon nitride ($Si_3N_4$), alumina ($Al_2O_3$), aluminosilicate (e.g., $Al_2SiO_5$), silica ($SiO_2$), boron carbide ($B_4C$), molybdenum carbide ($Mo_2C$), carbon (e.g., diamond particles), and the like. The powder or particles may be at a concentration of 20-70 vol. % of the slurry. The carrier material may be any carrier material including, but not limited to, paraffinic binders such as paraffin waxes and heavy mineral oils, water, ethanol, isopropyl alcohol, methyl ethyl ketone, toluene, and the like. The carrier material may be at a concentration of a remaining 30-80 vol. % of the slurry. In some examples, the slurry may be heated up past a melting point of the carrier material system and injected into fixed tooling 22.

In some examples, slurry infiltration system 20 may infiltrate preform 24 with a slurry having a relatively high viscosity using pressure and/or vacuum. For example, one or more components of slurry infiltration system 20 may apply a pressure or vacuum to facilitate infiltration of the slurry into or out of preform 24. Further operation and effect of pressure and vacuum of slurry infiltration system 20 will be described in FIG. 4 below.

In some examples, the infiltrated preform 24 may include an exterior surface that includes a surface texture that is a negative of a textured surface of fixed tooling 22 or the at least one insert 26. In some examples, the infiltrated preform 24 may include an exterior layer that has a thickness that corresponds to a distance of the at least one insert 26 from an interior wall of fixed tooling 22.

In some examples, slurry infiltration system 20 may apply a back pressure to fixed tooling 22 once infiltration has substantially proceeded to completion. For example, slurry infiltration system 20 may include components configured to create apply a back pressure to fixed tooling 22. In response to the back pressure, volumes of air within fixed tooling 22 may be reduced.

The technique of FIG. 3 may include post-infiltration processes to form a greenbody preform from the infiltrated preform 24. In some examples, slurry infiltration system 20 may dry the infiltrated preform to remove carrier material from the infiltrated preform and form a greenbody preform (108). For example, infiltrated preform 24 may be dried by controlling a temperature of the infiltrated preform to solidify the infiltrated preform, remove the carrier material, or both. In some examples, the infiltrated preform 24 may be cooled below a solidification temperature of the carrier material to solidify preform 24. The solidified preform 24 may be removed from fixed tooling 22. The solidified preform 24 may include some carrier material. The solidified preform may be heat treated to a removal temperature to remove or convert carrier material from the solidified preform 24. The removal temperature may be selected according to the evaporative or conversion characteristics of the carrier material. In other examples, the infiltrated preform 24 may be heated without a prior solidification step to cause the carrier material to evaporate or burn off.

In some examples, slurry infiltration system 20 may apply vibration to fixed tooling 22 during infiltration of preform 24 and/or drying of infiltrated preform 24. For example, slurry infiltration system 20 may include components configured to apply vibration to fixed tooling 22. In response to the vibrations, volumes of air within fixed tooling 22 may be reduced.

In some examples, more than one slurry may be applied to preform 24. For example, preform 24 may be infiltrated by a slurry and dried until a desired material thickness is achieved. In some examples, the more than one slurry may include different slurry compositions for different layers. For example, a first layer may include a first ceramic, while a second layer may include a second ceramic, such as a ceramic with higher heat tolerance.

In some examples, the greenbody preform may subsequently be exposed to a melt infiltration technique. In some examples, a melt infiltration system may infiltrate the greenbody preform with a molten phase, such as a molten metal or alloy, and cool the molten phase to form a ceramic matrix composite. In some examples, at least some of the molten metal or alloy may react with the powder or particles in the greenbody preform to form ceramic. For example, a molten silicon infiltrant may react with carbon powder or particles to form silicon carbide. In some examples, in addition to or instead of melt infiltration, an infiltration and pyrolysis system may infiltrate the greenbody preform with a preceramic polymer and pyrolyze the infiltrated greenbody preform to form a ceramic material and resulting ceramic matrix composite.

Figure 4:
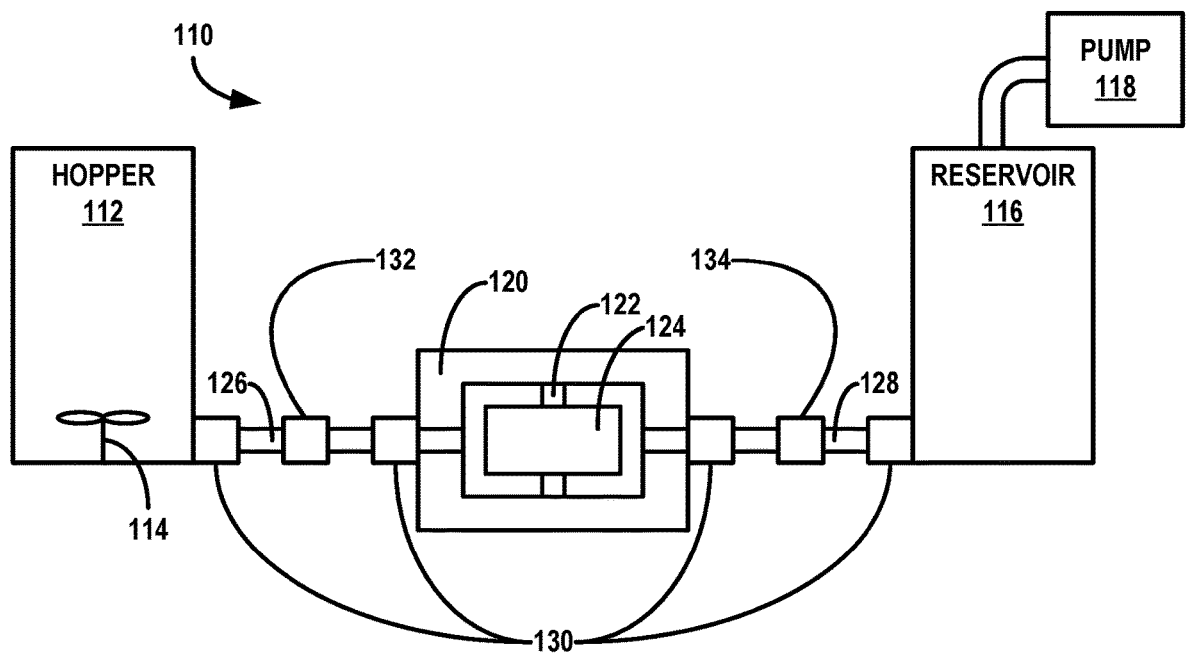
FIG. 4 is a conceptual diagram illustrating a slurry infiltration system that includes a fixed tooling and at least one insert.

FIG. 4 is a conceptual diagram illustrating a slurry infiltration system 110 that includes a fixed tooling and at least one insert. Slurry infiltration system 110 may include a hopper 112, a reservoir 116, and a pump 118. A controller (not shown) may be communicatively coupled to hopper 112, fixed tooling 120, reservoir 116, pump 118, and other accessory equipment not shown, such as vibration, humidity, or temperature control equipment coupled to fixed tooling 120.

Slurry infiltration system 110 may include hopper 112. Hopper 112 may be fluidically coupled to fixed tooling 120 through hopper piping 126. Hopper 112 may include a mixer and may be configured to mix a slurry that includes ceramic components and a carrier material as explained above. Hopper 112 may be configured to store and discharge the slurry for infiltration into fixed tooling 120. Discharge of slurry from hopper 112 may be controlled by hopper control valve 132.

Slurry infiltration system 110 may include reservoir 116. Reservoir 116 may be fluidically coupled to pump 118 and fixed tooling 120 through reservoir piping 128. Reservoir 116 may be configured to receive and discharge a portion of the slurry from fixed tooling 120. Reception and discharge of the slurry to and from reservoir 116 may be controlled by reservoir control valve 134. Pump 118 may be configured to control a pressure of the slurry to and from fixed tooling 120.

Fixed tooling 120 may be configured to house preform 124 using inserts 122. Fixed tooling 120, preform 124, and inserts 122 may correspond to fixed tooling 22, preform 24, and the at least one insert 26 described in FIGS. 1-3 above. Fixed tooling 120 may be mechanically coupled to hopper piping 126 and reservoir piping 128 through one or more quick releases 130.

To infiltrate fixed tooling 120, the controller may cause hopper 112 to mix the slurry, such as by using the mixer. The controller may cause pump 118 to create a vacuum in reservoir 116. The controller may open reservoir control valve 134 so that fixed tooling 120 is at the vacuum. The controller may open hopper control value 132 to discharge the slurry from hopper 112 to fixed tooling 120. The differential pressure between hopper 112, which may be at atmospheric pressure, and reservoir 116, which may be at the vacuum, may cause the slurry to infiltrate fixed tooling 120 and, correspondingly, preform 124.

After infiltration has substantially finished, the controller may cause hopper control valve 132 to close and a quick release 130 connecting fixed tooling 120 to hopper piping 126 to release. The controller may cause pump 118 to create a backpressure that is greater than atmospheric pressure. Once a sufficient amount of air is removed from preform 124, the controller may cause reservoir control valve 134 to close and a quick release 130 connecting fixed tooling 120 to reservoir piping 128 to release. Preform 124 may be removed from fixed tooling 120. By applying a greater than atmospheric backpressure to preform 124, slurry infiltration system 110 may remove more air from preform 124 than a slurry infiltration system that does not apply a greater than atmospheric backpressure.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. For example, an article of manufacture may include a computer-readable storage medium storing instructions that, when executed, cause a processor to receive a representation of a three-dimensional geometry of a preform. The instructions may further cause a processor to determine a set of dimensions of the preform from the representation of the preform and determine dimensions of at least one insert for a fixed tooling based on a dimensional tolerance of the preform, the set of dimensions of the preform, and dimensions of the fixed tooling. The instructions may further cause a processor to control an insert fabrication unit to manufacture the at least one insert based on the determined dimensions.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
causing a controller to:
  determine a set of dimensions of a preform from a representation of a three-dimensional geometry of the preform; and
  determine dimensions of at least one insert for a fixed tooling based on a dimensional tolerance of a greenbody preform formed from the preform, the set of dimensions of the preform, and dimensions of the fixed tooling, wherein the fixed tooling defines a tooling volume between a bulk exterior surface of the preform and an interior surface of the fixed tooling;
causing an insert fabrication unit to manufacture the at least one insert based on the determined dimensions;
positioning the at least one insert in the fixed tooling;
positioning the preform within the fixed tooling to contact the at least one insert;
causing a slurry infiltration system to infiltrate the preform with a slurry to form an infiltrated preform, wherein infiltrating the preform with the slurry includes adding the slurry to the tooling volume; and
causing the slurry infiltration system to dry the infiltrated preform to form the greenbody preform, wherein a set of dimensions of the greenbody preform is different from the set of dimensions of the preform.

2. The method of claim 1, wherein the at least one insert comprises at least one adaptive standoff configured to contact more than one surface of the preform.

3. The method of claim 1, wherein the at least one insert comprises at least one fixed shim and the fixed tooling comprises structures configured to house the at least one fixed shim.

4. The method of claim 1, wherein the fixed tooling comprises a textured interior surface.

5. The method of claim 1,
wherein the slurry comprises a ceramic powder
wherein the greenbody preform includes a matrix and a surface coating each comprising the ceramic powder.

6. The method of claim 4, wherein the surface coating of the greenbody preform includes the textured interior surface of the fixed tooling.

7. A method comprising:
causing a controller to:
  determine a set of dimensions of a preform from a representation of a three-dimensional geometry of the preform;
  determine dimensions of at least one insert for a fixed tooling based on a dimensional tolerance of a greenbody preform formed from the preform, the set of dimensions of the preform, and dimensions of the fixed tooling, wherein the fixed tooling defines a tooling volume between a bulk exterior surface of the preform and an interior surface of the fixed tooling; and
  output an indication of a placement parameter of the at least one insert based on the determined dimensions of the at least one insert;
positioning the at least one insert in the fixed tooling;
positioning the preform within the fixed tooling to contact the at least one insert;
causing a slurry infiltration system to infiltrate the preform with a slurry to form an infiltrated preform, wherein infiltrating the preform with the slurry includes adding the slurry to the tooling volume; and
causing the slurry infiltration system to dry the infiltrated preform to form a greenbody preform, wherein a set of dimensions of the greenbody preform is different from the set of dimensions of the preform.

8. The method of claim 7, wherein the at least one insert comprises at least one fixed shim, the fixed tooling comprises at least one structure configured to house the at least one fixed shim, and the placement parameter comprises a type of the at least one insert that includes the determined dimensions.

9. The method of claim 7, wherein the at least one insert comprises at least one adaptive shim, the fixed tooling comprises at least one channel configured to house the at least one adaptive shim, the placement parameter comprises a placement distance of the at least one adaptive shim, and the at least one adaptive shim is positioned into the fixed tooling based on the placement distance.

10. The method of claim 7, wherein the fixed tooling comprises a textured interior surface.

11. A system, comprising:
a controller configured to:
  receive a representation of a three-dimensional geometry of a preform;
  determine a set of dimensions of the preform from the representation of the preform; and
  determine dimensions of at least one insert for a fixed tooling based on a dimensional tolerance of a greenbody preform formed from the preform, the set of dimensions of the preform, and dimensions of the fixed tooling, wherein the fixed tooling defines a tooling volume between a bulk exterior surface of the preform and an interior surface of the fixed tooling; and
a slurry infiltration system configured to:
  infiltrate the preform with a slurry to form an infiltrated preform, wherein infiltrating the preform with the slurry includes adding the slurry to the tooling volume, and
  dry the infiltrated preform to form the greenbody preform, wherein a set of dimensions of the greenbody preform is different from the set of dimensions of the preform.

12. The system of claim 11, wherein the system further comprises an insert fabrication unit, and wherein the controller is further configured to control the insert fabrication unit to manufacture the at least one insert based on the determined dimensions.

13. The system of claim 11, wherein the controller is further configured to output an indication of a placement parameter of the at least one insert based on the determined dimensions of the at least one insert.

14. The system of claim 11, further comprising the fixed tooling configured to:
house the at least one insert in the fixed tooling based on the dimensions of the at least one insert; and
house the preform within the fixed tooling to contact the at least one insert.

15. The system of claim 11, wherein the at least one insert comprises at least one fixed shim and the fixed tooling comprises structures configured to house the at least one fixed shim.

16. The system of claim 11, wherein the at least one insert comprises at least one adaptive shim and the fixed tooling comprises at least one channel configured to house the at least one adaptive shim.

17. The system of claim 11, wherein the at least one insert comprises at least one adaptive standoff configured to contact more than one surface of the preform.

18. The system of claim 14, wherein the fixed tooling comprises a textured interior surface.

19. The system of claim 12, wherein the insert fabrication unit comprises a three-dimensional printer.

* * * * *